United States Patent [19]

Burns et al.

[11] 3,762,040

[45] Oct. 2, 1973

[54] METHOD OF FORMING CIRCUIT CROSSOVERS

[75] Inventors: John Andrew Burns, New Hope, Pa.; Alexander Coucoulas, Bridgewater Twp., Somerset County, N.J.

[73] Assignee: Western Electric Company, Incorporated, New York, N.Y.

[22] Filed: Oct. 6, 1971

[21] Appl. No.: 186,833

Related U.S. Application Data

[63] Continuation-in-part of Ser. No. 864,856, Oct. 8, 1969, abandoned.

[52] U.S. Cl. .................... 29/593, 29/471.1, 29/493, 29/497.5, 29/577, 29/591, 29/628, 29/407

[51] Int. Cl. .................... G01r

[58] Field of Search .................... 29/626, 627, 628, 29/471.1, 471.3, 493, 497.5, 577, 589, 590, 591, 593, 407; 317/234; 73/95

[56] References Cited

UNITED STATES PATENTS

| | | | |
|---|---|---|---|
| 3,133,778 | 5/1964 | Seaver | 339/220 |
| 3,331,125 | 7/1967 | McCusker | 317/234 |
| 3,381,081 | 4/1968 | Schalliol | 317/234 |
| 3,474,297 | 10/1969 | Bylander | 317/101 |
| 3,480,836 | 11/1969 | Aronstein | 317/100 |
| 3,560,256 | 2/1971 | Abrams | 317/234 |
| 3,588,741 | 6/1971 | Glance | 317/234 |
| 3,597,839 | 8/1971 | Jaccodine | 317/234 |
| 3,615,949 | 10/1971 | Hicks | 317/234 |
| 3,634,930 | 1/1972 | Cranston | 29/593 X |

OTHER PUBLICATIONS

Scrupski, Stephen E., "ICs on Film Strip Lend Themselves to Automatic Handling by Manufacturer and User, Foo," Electronics, 2/71.

*Primary Examiner*—Robert D. Baldwin
*Assistant Examiner*—Ronald J. Shore
*Attorney*—Jack Schuman

[57] ABSTRACT

Crossovers are fabricated by forming a conductive element on a carrier member and deforming selected portions of the conductive element into arches. The arches are formed either prior to or during bonding so that after bonding the arches cross over any intervening circuit elements. The carrier member is associated with a backing member having slots at those portions of the conductive element which are to be formed into arches. Deformation of the conductive elements into the slots is employed to form the arches. An intermediate material can be used to separate the conductive element from the circuit patterns at selected crossover points so that the conductive element is deformed into the slots during bonding. Or, the conductive elements can be deformed into the slots prior to bonding.

18 Claims, 9 Drawing Figures

INVENTORS
J. A. BURNS
A. COUCOULAS

W. L. Williamson
BY ATTORNEY

METHOD OF FORMING CIRCUIT CROSSOVERS

CROSS-REFERENCE TO RELATED APPLICATION

This patent is a continuation-in-part of copending application Ser. No. 864,856 filed Oct. 8, 1969 and now abandoned.

BACKGROUND OF THE INVENTION

This invention relates generally to the bonding of circuit elements to bonding sites on a substrate and particularly to the bonding of crossovers to a substrate.

One of the design constraints usually imposed on a thin film or integrated circuit is that all of the circuits lie in a single plane with each of the circuit elements spaced a suitable distance from each other. As circuits have become increasingly more complex, it has been extremely difficult to design circuits which will comply with this design constraint. As a result, a great deal of development effort has been expended to develop methods for interconnecting different portions of a circuit without being constrained to remain in a single plane.

One solution to this problem has been to fabricate "crossovers" which electrically interconnect different portions of a circuit while extending out of the plane of the circuit to cross over intervening circuit elements. As will be appreciated, crossovers give a great deal more flexibility to circuit design and permit the design of the type of complex circuits which are required by modern technology.

One method for fabricating crossovers is disclosed in U. S. Pat. No. 3,461,524 to Lepselter and assigned to the Bell Telephone Laboratories. In this method, an intermediate material is deposited over a circuit element which is to be crossed over and a conductive material is deposited over the intermediate material and onto selected areas of the different portions of the circuit which are to be interconnected. The intermediate material is then removed leaving an air dielectric between the crossover and circuit element. If desired, a solid dielectric can be deposited between the crossover and the circuit element.

There are several areas of manufacturing concern in using the above-described method. For example, the etching steps required for removing the intermediate material may be incompatible with other materials on the circuit thereby resulting in damage to the circuit. Also, if it is necessary to bond circuit elements such as beam-lead integrated circuits to the circuit, there is danger that the relatively fragile crossovers will be damaged during bonding. On the other hand, it would be difficult to form the crossovers on the circuit after such circuit elements have been bonded to the circuit.

An additional area of concern is the difficulty of testing the crossovers to insure they are properly bonded to the circuit. As will be appreciated, it is extremely difficult, time consuming and expensive to individually test each crossover on a circuit. Also, it is difficult to test a crossover without destroying the bond or damaging the crossover.

SUMMARY OF THE INVENTION

It is therefore an object of this invention to provide an improved method of fabricating crossovers.

An additional object of this invention is to provide a method of bonding a conductor to selected areas of different portions of a circuit while crossing over intervening circuit elements.

Still another object of this invention is to provide a method of testing the bond strength of each crossover.

With the foregoing and other objects in view, the method of this invention contemplates the steps of: (1) deforming a selected portion of a conductive element to form a crossover arch; (2) aligning the conductive element with bonding sites on a circuit pattern; and (3) bonding the conductive element to the bonding sites. The step of deforming the conductive element is facilitated by the additional step of forming the conductive element on a carrier member. In addition, the method of this invention also contemplates testing the bond at each bonding site by stripping the carrier member from the conductive element after bonding.

DETAILED DESCRIPTION

Figures 1, 2:
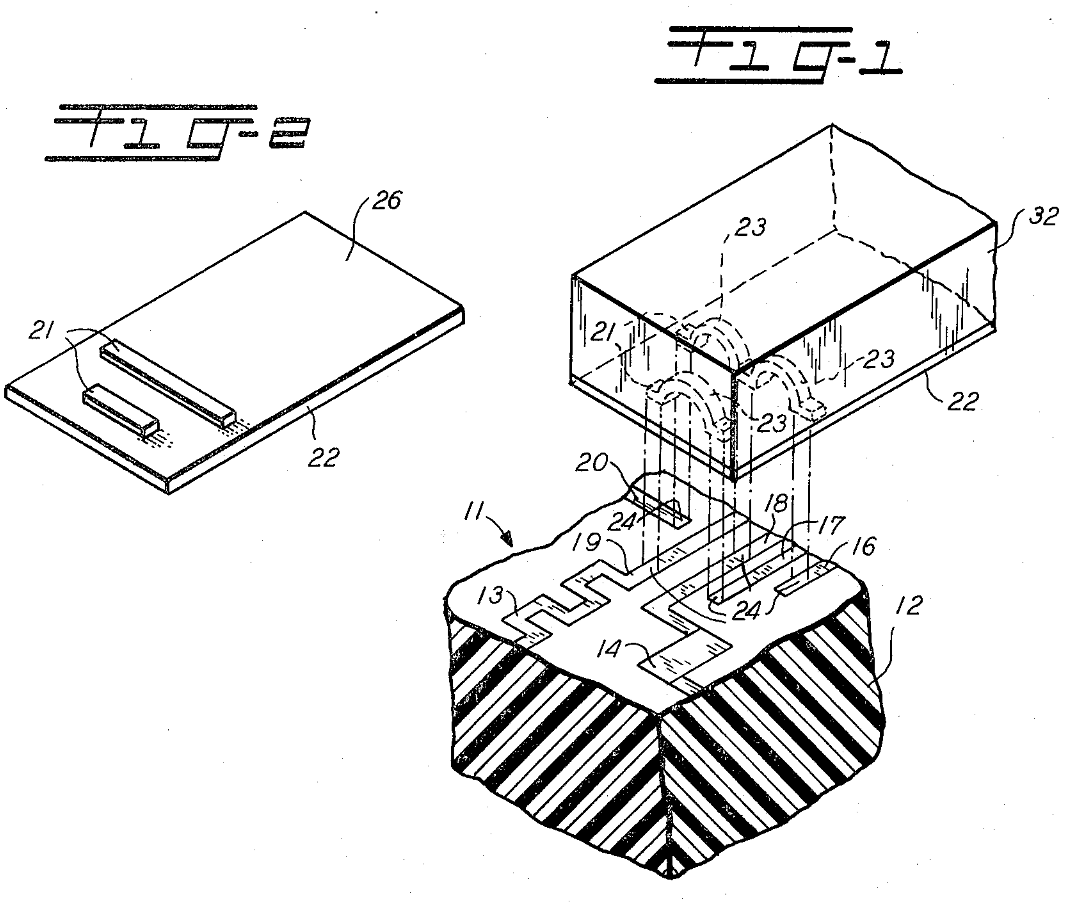
FIG. 1 illustrates a circuit pattern on a substrate aligned with circuit elements formed on a carrier member.
FIG. 2 illustrates a carrier member having conductive elements formed thereon.

Referring now to FIG. 1, a small portion of a conventional circuit pattern 11 supported on a substrate 12 is shown for purposes of illustration. The illustrated portion of the circuit pattern includes a thin-film resistor 13, a thin-film capacitor 14 and thin-film conductors 16–20. As should be appreciated, the particular circuit configuration or the particular circuit elements illustrated are not critical in any way to the method of this invention and are only shown to facilitate an understanding of the invention.

The method of this invention includes the steps of: (1) deforming a selected portion of a conductive element 21 to form a crossover arch 23; (2) aligning the conductive element with bonding sites 24—24 on the circuit pattern 11; and (3) bonding the conductive element to the bonding sites. The step of deforming the conductive element is facilitated by first forming the conductive element on a carrier member 22. An additional step of testing the bond at each bonding site by stripping the carrier member from the conductive elements may also be used.

As illustrated, the conductive elements 21—21 are bonded to conductors 17 and 19 and to conductors 16, 18, and 20 while the arches cross over conductor 18 and conductors 17 and 19, i.e., the intervening circuit elements.

Referring now to FIG. 2, the step of forming the conductive elements 21—21 on the carrier member 22 may be accomplished in several different ways. For example, the conductive elements may be formed by (1) electrolessly plating a layer (not shown) of a first conductive material onto a major surface 26 of the carrier member, (2) generating a conventional photoresist pattern (not shown) which exposes those areas of the first conductive material where conductive elements 21—21 are desired, (3) plating a second conductive material through the photoresist pattern onto the exposed areas of the first conductive material, (4) removing the photoresist pattern, and (5) etching away the unwanted portion of the first conductive material to leave conductive elements 21—21 on the carrier member. When the first conductive material is a 0.7 mil thick layer of copper and the second conductive material is a 0.3 mil thick layer of gold, the unwanted copper may be removed with a mixture of chromic acid and sulfuric acid, such as Shipley's CR-10-A, without deleteriously affecting the copper under the gold. In other words, as the gold is not attacked by the etchant, the gold acts as an etch resist to permit the preferential etching of the unwanted copper, i.e., the copper not coated by the gold.

The process set forth in U. S. Pat. No. 3,562,005 may also be used to form the conductive elements 21-21. Using this process, a precious metal is deposited onto the carrier member at the desired locations for the conductive elements and the conductive elements are then formed by electrolessly depositing a conductive material onto the precious metal. In addition, the conductive elements may be formed on the carrier member by adhesively attaching a foil (not shown) to surface 26, applying an etch resist to the foil to protect those areas where a conductive element is desired and then etching away those areas of the foil not protected by the etch resist to form the desired conductive elements.

Figure 3:
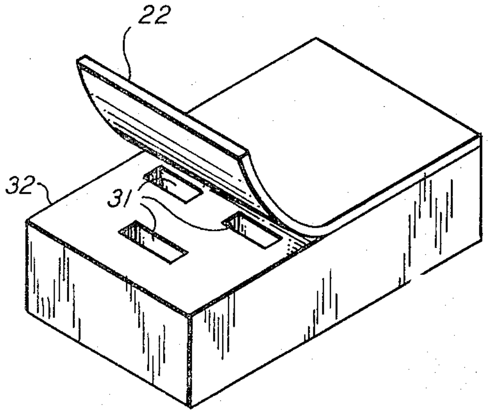
FIG. 3 illustrates a carrier member associated with a backing member having slots for receiving crossover arches.
Figure 4:
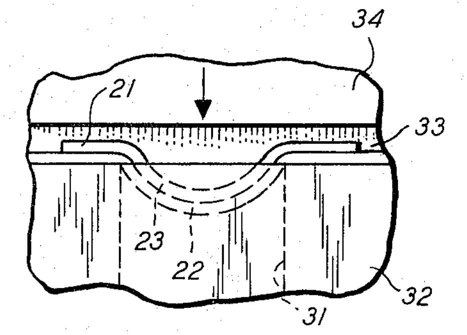
FIG. 4 illustrates a suitable arrangement for forming crossover arches.
Figures 5, 8, 9:
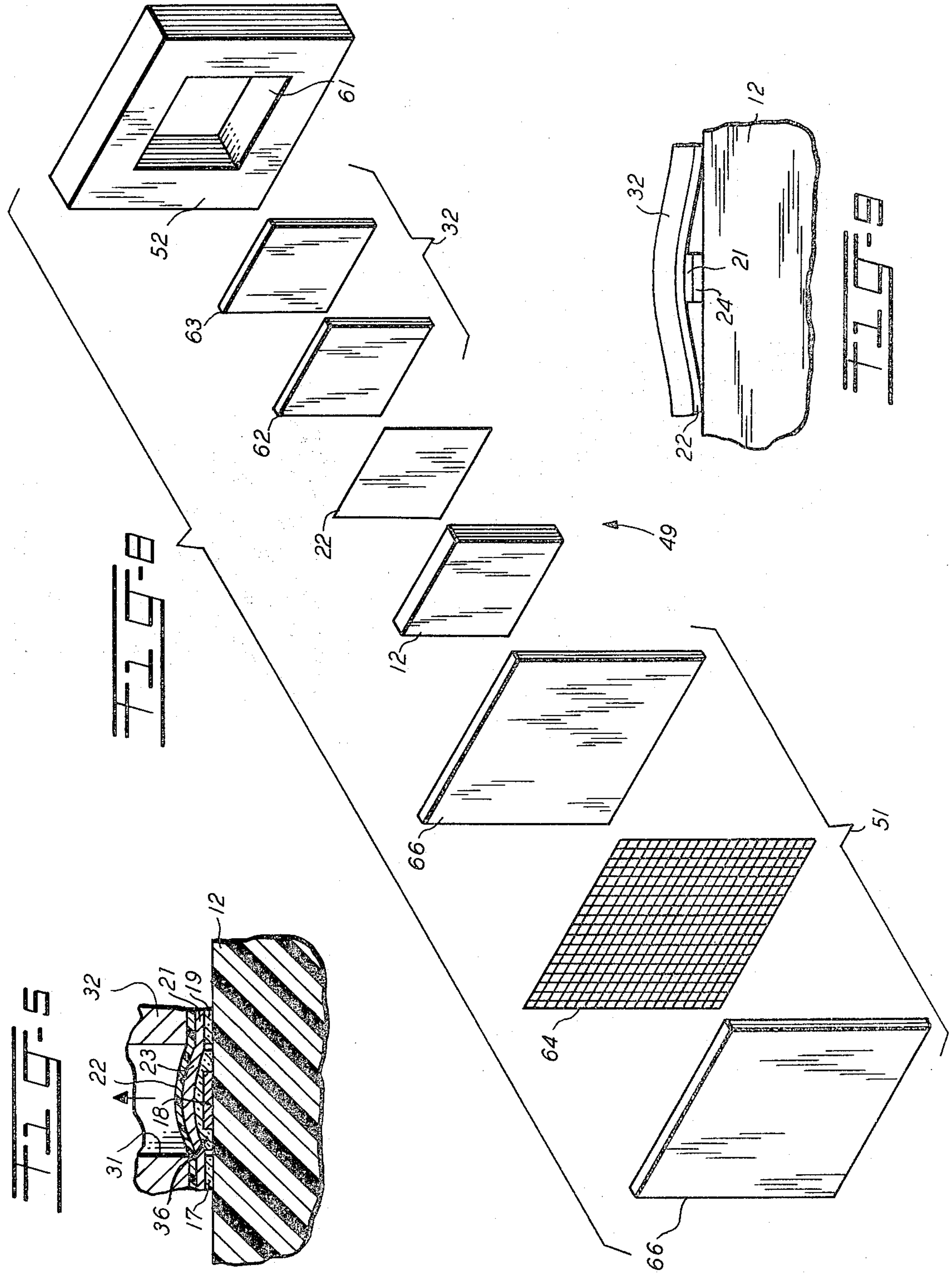
FIG. 5 illustrates an alternative embodiment for forming crossover arches.
FIG. 8 is an exploded view of an assembly suitable for use in the apparatus of FIG. 7 to bond circuit elements to a circuit pattern.
FIG. 9 illustrates how doming multiplies bonding pressure applied at a bonding site.

Referring now to FIGS. 3-5, the steps of deforming selected portions of the conductive elements 21—21 to form crossover arches 23—23 may also be accomplished in a number of different ways. For example, the arches 23—23 may be formed prior to bonding the conductive elements 21—21 to the bonding sites 24—24 (FIGS. 1 and 4) or the arches may be formed during bonding of the conductive elements (FIG. 5). In either event, the arches 23—23 are conveniently formed by deforming the selected portions of the conductive elements into slots 31—31 of a backing member 32.

If the arches are formed prior to bonding (FIG. 4) a resilient member 33 is employed to deform the selected portions of the conductive elements into the slots 31—31. This is accomplished by placing the resilient member 33, e.g., a rubber pad, over the surface 26 of the carrier member and placing the resilient member, carrier member and backing member into a hydraulic press (not shown). Compression of the resilient member 33 by ram 34 of the hydraulic press extrudes the resilient member into the slots 31—31 and deforms the selected portions of the conductive elements into the slots to form the crossover arches 23—23.

A pressure of 700 psi across the resilient member is sufficient to form the crossover arches when (1) the resilient member is a 0.1 inch thick rubber pad, (2) the carrier member is a 1 mil thick sheet of Kapton, (3) the conductive element is from 4.5 to 5.5 mils wide and 35 to 40 mils long and includes a 0.7 mil thick first layer of copper covered by a 0.3 mil thick second layer of gold, and (4) the backing member is a five mil thick sheet of molybdenum having slots of from 25 mils to 80 mils long and a width of greater than one-half the length of the slot, i.e., from 12½ mils to 40 mils.

If the crossover arches 23—23 are formed during bonding (FIG. 5), an intermediate material 36 is employed to space the conductive element from any intervening circuit element, e.g., conductor 18 and to deform the selected portions of the conductive elements into the slots 31—31. The intermediate material 36 should have a length and width slightly less than its associated slot and formed either over the intervening circuit element or the conductive element. As will be discussed more fully below, during bonding, the backing member 32 is urged towards the substrate 12 to apply a desired bonding force to the conductive elements at the bonding sites. Accordingly, during bonding, the intermediate material spaces the conductive element from the intervening circuit element, e.g., conductor 18, and acts as an anvil to deform the selected portions of the conductive element into the slots thereby forming the crossover arches 23—23. If a relatively ductile material, such as aluminum, is used as the backing member, it is not essential to provide slots in the backing member. The intermediate material will deform the conductive element as well as the ductile backing member to form the arches and is a satisfactory alternative to using a slotted backing member.

Any suitable material, such as a conventional photoresist or a glass frit, can be used as the intermediate material 36. If a photoresist is used, conventional photoresist pattern generation techniques can be employed to deposit the photoresist in the desired areas on either the circuit pattern 11 or the conductive elements 21—21. Also, any conventional solvent can be used to remove the photoresist after the conductive element has been bonded to the circuit and the crossover arches have been formed. If a glass frit is used, conventional silk screening techniques can be employed to deposit the frit in the desired areas and the frit is then fired. If desired, any conventional etchant can be used to remove the glass frit. If the intermediate material is a suitable dielectric, it can be left in place to form a solid dielectric crossover.

Conventional photoresist pattern generation techniques can be employed to provide a precision etch resist so that the slots 31—31 can be etched in the backing member at the desired locations. Also, alignment between the slots and the conductive elements is greatly facilitated by attaching the carrier members to the backing member with a suitable adhesive prior to the formation of the conductive elements 21—21.

Figure 6:
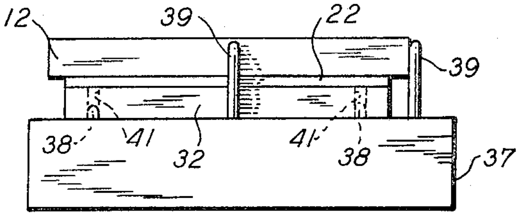
FIG. 6 illustrates a fixture suitable for aligning circuit elements with bonding sites on a circuit pattern.

The step of aligning the conductive elements 21—21 with the bonding sites 24—24 may be carried out in any suitable manner. For example, as illustrated in FIG. 6, a fixture 37 having a plurality of locating pins 38—38 and 39—39 may be used for this purpose. By providing locating apertures 41—41 in the backing member 32 which mate with the locating pins 38—38, the backing member 32 is readily positioned in the fixture 37. By attaching the carrier member 22 to the backing member, this also positions the carrier member and, therefore, conductive elements 21—21 in the fixture 37. The circuit pattern 11 is then positioned in the fixture 37 to align the bonding sites 24—24 with the conductive elements 21—21 by bringing the substrate 12 into engagement with locating pins 39—39. The desired alignment between the conductive elements and bonding sites may be retained by using a conventional adhesive such as Rohm and Haas' acryloid B7. The adhesive may be applied, for example, to diagonally opposed corners of the carrier member prior to positioning the substrate 12. This permits removal of the backing member, carrier member and substrate from the fixture without disturbing the desired alignment.

As will be appreciated, forming the locating apertures 41—41 at the same time as the slots 31—31 will greatly facilitate the desired alignment of the slots in the fixture 37. Also, this facilitates alignment of the conductive elements with the slots as well as alignment of the conductive elements in the fixture. For example, as a mask (not shown) is usually employed to generate the photoresist pattern used to form the conductive elements, the locating apertures 41—41 can be employed to locate the mask on the carrier member, if the carrier member is attached to the backing member. In this manner, the position of the slots 31—31 and the conductive elements 21—21 are in effect keyed to the locating apertures 41—41 and therefore to locating pins 38—38. In a like manner, the same edges of the substrate which engage pins 39—39 to align the substrate in the fixture are used to locate the masks (not shown) employed to generate the circuit pattern 11. this in effect keys the position of the bonding sites 24—24 to pins 39—39. By properly positioning the pins 38—38 with respect to pins 39— 39, the desired alignment between the bonding sites and conductive elements is readily obtained.

Figure 7:
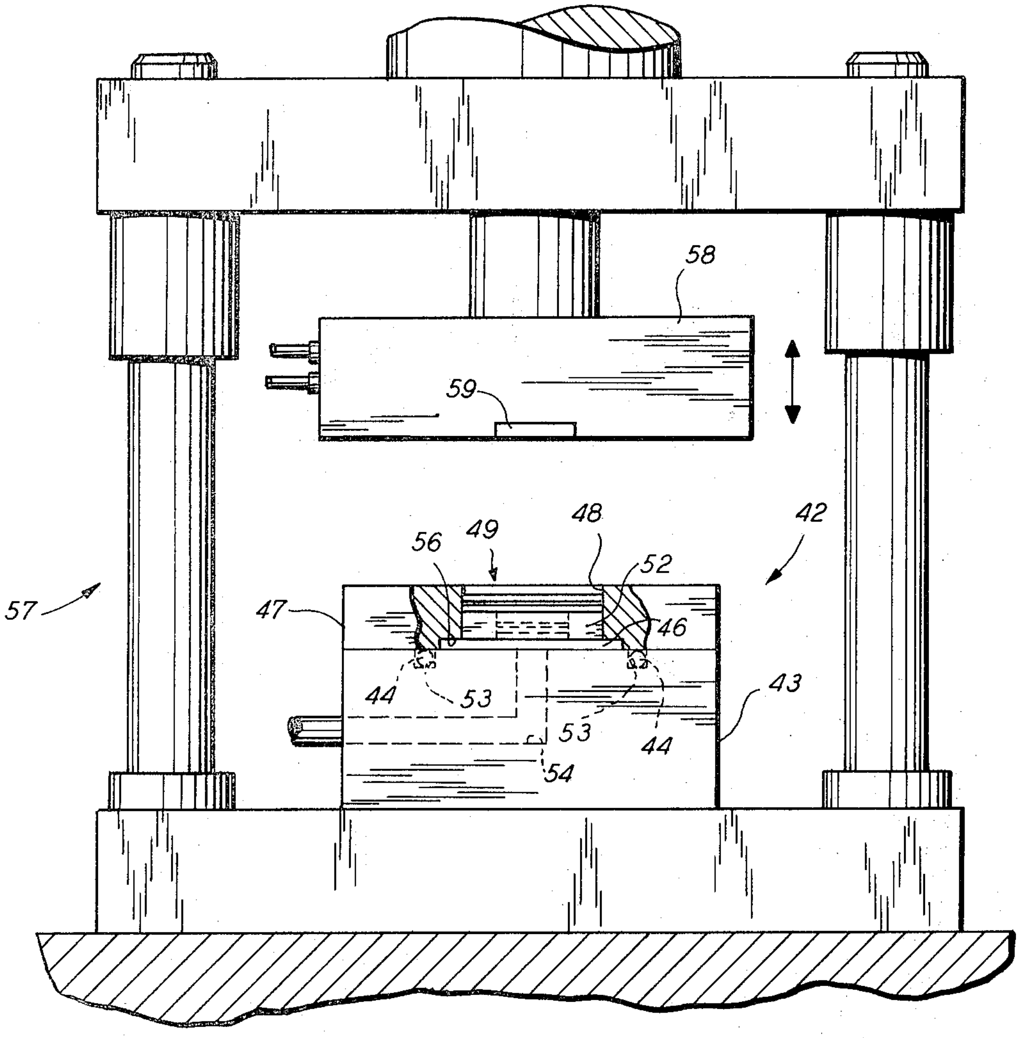
FIG. 7 illustrates an apparatus suitable for bonding crossovers on a carrier member to bonding sites on a circuit pattern.

The step of bonding the conductive elements 21—21 to the bonding sites 24—24 may be advantageously accomplished using fixture 42 as illustrated in FIG. 7. The fixture 42 includes a base 43, a sealing member 44, such as an O-ring, a diaphragm 46 and a spacer member 47. The spacer member 47 is provided with an aperture 48 for receiving and retaining an assembly 49. As seen in FIG. 8, the assembly 49 includes the backing member 32, the carrier member 22, the substrate 12 having the circuit pattern 11 (FIG. 1) thereon, a compensating member 51 and a frame 52.

The base 43 (FIG. 7) is provided with a channel 53 for retaining the sealing member 44 and with a passageway 54 for supplying high pressure fluid such as compressed gas to the diaphragm 46. The spacer member 47 rests directly on the sealing member 44 and the spacer member is provided with a recessed portion 56 for receiving the diaphragm 46. In this manner, when the fixture 42 is positioned in hydraulic press 57 and ram 58 is lowered, the spacer member is urged against the sealing member 44 to form a high pressure seal between the spacer member and the base 43.

As seen in FIGS. 7 and 8, the frame 52 has the same outer dimensions as aperture 48 of the spacer member 47 and is provided with an aperture 61 for receiving the backing member 32, carrier member 22 and substrate 12. The assembly 49 is loaded into the aperture 48, with the frame 52 resting on the diaphragm 46 and the backing member 32, the carrier member 22, and the substrate 12 retained within aperture 61 of the frame 52. The backing member also rests on the diaphragm 46 with the carrier member intermediate the backing member and the substrate 12. The compensating member 51 is then placed over the substrate and the frame. The thickness of the spacer member is greater than the thickness of the assembly 49 so that with the assembly 49 retained in the aperture 48 of the spacer member, the ram 58 will not engage the assembly when lowered against the spacer member. Accordingly, by applying a fluid under high pressure to the diaphragm 46, the diaphragm is forced against the backing member 32 and into the aperture 48 to lift the assembly 49 in the spacer member and to urge the assembly against the ram 58 thereby pressurizing the assembly. By providing the ram 58 with a suitable heating element 59, thermal energy is applied to the assembly when urged against the ram by the diaphragm.

The frame 52 serves two purposes. First, by making the frame from a suitable insulating material, such as a fiber glass reinforced silicon resin, the frame thermally insulates the substrate from the spacer member 47 so that thermal energy conducted to the substrate from the heating element 59 will not be lost through conduction to the spacer member. Also, thermal loss to the spacer member is further reduced when the heating element 59 is larger than the aperture 61 in frame 52 but smaller than the aperture 48 in spacer member 47. This minimizes the loss of thermal energy to the spacer member while insuring that thermal energy is uniformly applied across the substrate. Secondly, the frame 52 centers the substrate on the diaphragm 46 so that the diaphragm will apply an equal pressure across the backing member 32. As will be appreciated, when the diaphragm is forced into the aperture 48 to urge the assembly 49 against the ram 58, the pressure applied by the diaphragm at the edges of the aperture 48 is less than the pressure applied across the rest of the diaphragm, due to the constraint of the edges of the aperture on the diaphragm. Accordingly, the frame 52 serves to space the substrate away from this low pressure region.

In this manner, pressure applied across the backing member 32 is controlled by the pressure at the diaphragm 46 and the thermal energy applied to the substrate 12 is controlled by the temperature of the heating element 59 and the time interval during which the diaphragm urges the assembly 49 against the heating element. These parameters can be adjusted as desired to affect a bond between the crossovers and the circuit pattern at the bonding sites.

In addition, it has been found that the backing member can be used as a pressure multiplier so that the pressure applied at a given bonding site actually exceeds the pressure applied over the same area on the diaphragm. It has been found, for example, that if a relatively stiff backing member is employed, such as a 10 mil thick molybdenum sheet, the backing member will dome over the bonding sites thereby multiplying the bonding pressure applied to the bonding sites. For example, as viewed in FIG. 9, when the backing member 32 domes over a bonding site 24, the pressure applied to the bonding site is equal to the force applied across the top of the dome divided by the area of the bonding site. The pressure multiplication at the bonding site occurs because the pressure applied to the much larger area of the dome is applied to the much smaller area of the bonding site. It has been estimated that this doming effect can multiply the pressure applied to the bonding site by five to 30 times the pressure applied across the same bonding site area at the diaphragm.

Also, it has been found that the slots 31—31 can be optimally formed in a molybdenum backing member with the accuracy required when the backing member is not more than 5 mils thick. Accordingly, if a backing member thicker than 5 mils is required, e.g., 10 mils, in order to obtain a desired doming effect, a two piece backing member may be used, i.e., a 5 mil thick sheet 62 with slots formed therein and a 5 mil thick sheet 63 without slots therein. Of course, the thickness of either sheet 62 or 63 may be adjusted to obtain the desired doming effect. As will be appreciated, if the backing member is sufficiently thin or flexible, it will conform to the conductive elements and there is no doming effect and no force multiplication. Also, if the backing member is sufficiently thick or rigid, there is again no doming effect but maximum force multiplication occurs, i.e., the force applied to the bonding sites is equal to the pressure applied across the entire backing member divided by the area of the bonding sites. When two sheets are employed as the backing member, the carrier member is conveniently attached only to the slotted sheet 62.

As the arches 23—23 extend into the slots 31—31 of the backing member 32, pressure on the arches is minimal and they are not collapsed during bonding. In fact, it has been found that the arches tend to lift or rise during bonding due to the deformation of the conductive elements at the bonding sites. In other words, as the conductive elements are deformed at the bonding sites, material is extruded towards the arches to lengthen the arches thereby causing them to lift or rise. Of course, when the arches 23—23 are formed during bonding by the use of the intermediate material 36 (FIG. 5), the intermediate material forms and supports the arches during bonding.

As will also be appreciated, due to variations in the substrate such as a lack of parallelism of the major surfaces, waviness, warpage, etc., it is extremely difficult to simultaneously bond at high pressure to multiple bonding sites across the substrate without cracking the substrate. Accordingly, the compensating member 51, for example, an aluminum screen 64 sandwiched between two 3 to 5 mil thick molybdenum sheets 66—66 is employed to compensate for variations in the substrate. The sheets 66 are employed to prevent bonding of the screen 64 to the ram 57 or the substrate 12.

An aluminum screen has been found to be particularly suitable for compensating for variations in the substrate. For example, if aluminum wires having a diameter of twenty mils are employed to form the screen, the screen will have a thickness of forty mils at those points where the wires cross. During bonding, high points on the substrate will deform the screen so that the screen conforms to the surface of the substrate. In effect, the screen serves as a plurality of discretely spaced points which automatically adjust in height during bonding to support the substrate while compensating for variations therein.

A pressure of 800 psi at the diaphragm 46, a temperature of 340° C at the heating element 59 and a bonding interval of 20 seconds is effective in bonding the conductive elements 21—21 to the bonding sites 24—24. These parameters, for example, are appropriate when (1) the backing member 32 includes two 5 mil thick molybdenum sheets 62 and 63 and the slotted sheet 62 has slots 25 to 80 mils long and 12.5 to 40 mils wide, (2) the carrier member 22 is a 1 mil thick sheet of Kapton, (3) the conductive elements 21—21 are 35 to 80 mils long by 4.5 to 5.5 mils wide by 1 mil thick, the conductive elements have a first 0.7 mil thick layer of copper covered by a second 0.3 mil thick layer of gold, (4) the bonding sites are a 12,000 angstrom layer of gold on a 3,000 angstrom layer of palladium on a 750 angstrom layer of titanium for a circuit pattern having thin film conductive paths thereon, and a 12,000 angstrom layer of gold on a 3,000 angstrom layer of palladium on a 750 angstrom layer of titanium on a 900 angstrom layer of tantalum nitride when the circuit pattern has thin-film resistors thereon, and a 10,000 angstrom layer of gold on a 500 angstrom layer of nichrome on a second 10,000 angstrom layer of gold on a second 500 angstrom layer of nichrome on a 900 angstrom layer of tantalum nitride on a 4,000 angstrom layer of beta tantalum on a 500 angstrom layer of tantalum pentoxide when the circuit pattern has thin-film resistors and capacitors thereon, (5) the substrate is a 3¾ inch wide by 4½ inch long by 24 mils thick alumina body, (6) the aperture 48 in spacer member 47 is 4¾ inch wide by 5½ inch long, (7) the compensating member includes a 40 mil thick No. 14 mesh aluminum screen sandwiched between two 3 to 5 mil thick molybdenum sheets and (8) the diaphragm is a 3/32 inch thick sheet of fiber glass reinforced silicon rubber.

As will be appreciated, other circuit elements can also be bonded to the circuit pattern simultaneously with the bonding of the conductive elements. For example, if it is desired to bond one or more beam-leaded devices (not shown) to the circuit pattern, the devices are attached to the carrier member at the appropriate locations and are bonded with the conductive elements. Slots are advantageously provided in the backing member to receive the body of the beam-leaded devices so that the devices will not be damaged during bonding. In this manner, it is not necessary to employ more than one bonding operation to attach various components to the circuit and this greatly reduces the chance of damaging various circuit elements during multiple loading operations. Also, by bonding all circuit elements in a single operation, the bonding cost is greatly reduced.

The step of testing the bond at each bonding site is accomplished by stripping the carrier member from the conductive elements after the conductive elements have been bonded to the bonding sites. As discussed above, formation of the conductive elements on the carrier member either involves the step of electrolessly plating a conductive material onto the carrier member or the step of attaching a foil to the carrier member with an adhesive. In either event, the conductive elements are tenaciously attached to the carrier member and stripping of the carrier member from the conductive elements exerts a pull test at each bonding site. Of course, if the bond strength between the conductive elements and the carrier member exceeds the bond strength between the conductive elements and the bonding sites, the conductive elements will be pulled loose from the bonding sites. Accordingly, by controlling the strength of the bond between the carrier member and the conductive elements, a desired pull test is applied to each bonding site when the carrier member is stripped from the conductive elements.

It has been found that when "Kapton" (trademark) is employed as the carrier member the strength of the bond between the carrier member and the conductive elements after bonding can be controlled by controlling the amount of water absorbed by the Kapton prior to bonding. Kapton is a relatively new film material of the polyimide type which is marketed by the E. I. Du Pont de Nemours & Co., and is related to nylon, chemcially speaking, the latter being a polyamide. Polyimide materials of this type are prepared by a condensation reaction of pyromellitic dianhydride with an appropriate amine, such as oxydianiline. These films have several surprising properties. Because of the high aromaticity of the polymer construction, they possess remarkable thermal stability. A 1 mil film will withstand temperatures as high as 1,000° F, if only briefly. They are very effective thermal and electrical insulators, and, when heated, previously absorbed water molecules are driven out of the polymer structure.

Apparently, when water absorbed by the Kapton prior to bonding is driven out of the film during bonding, the bond between the carrier member and conductive elements is reduced. Indeed, the more water absorbed by the Kapton prior to bonding, the greater is the reduction in the bond strength. Accordingly, rather than absorbing sufficient water to completely release the conductive elements from the carrier member during bonding, it is desirable to absorb only sufficient water to reduce the bond strength between the conductive elements and the carrier member to a desired level. Then, by pulling the carrier member from the conductive elements, a non-destructive pull test is applied to each bonding site. If the bond is sufficiently strong to withstand this pull test, then the circuit is not affected. If, however, there is a poor bond, the conductive element is pulled loose from the bonding site and can be readily discovered by visual inspection. Also, if the conductive element is not damaged, the conductive element can be rebonded with a conventional needle bonder.

By way of example, if a 1 mil thick Kapton carrier member having electrolessly deposited conductive elements thereon is placed in an oven for five minutes at a temperature of 120° F and at atmospheric pressure, essentially all of the absorbed water is driven out of the Kapton film. If the conductive elements are then bonded in the fixture 42 with the heating element 59 at 340° C, 800 psi being applied to the diaphragm 46 and for a bonding interval of 45 seconds, it requires 31 grams of force to pull the carrier member from the conductive elements when a 45° pull angle is employed and the carrier member is peeled perpendicular to the length of the conductive elements. On the other hand, the pull strength is 22 grams for an identical carrier member which is not heated but which is left at room temperature and pressure and which experiences the same bonding conditions. Also, the pull strength is 15 grams for an identical carrier member which is soaked in water for 15 minutes at atmospheric pressure prior to bonding and which experiences the same bonding conditions. In other words, the amount of water absorbed by the Kapton prior to bonding determines the amount of water which will be driven from the polymer structure during bonding and therefore, how much the bond strength between the conductive elements and the carrier member will be reduced during bonding.

Even if it is not desired to employ the bond strength between the carrier member and the conductive elements to test bond strength at the bonding sites, some residual bond strength can be advantageously employed to lift any arches 23—23 which may have been lowered during the bonding. Of course, even if an arch has collapsed during bonding or mishandling, residual bond strength between the carrier member and the conductive elements can be employed to repair the crossover arch by lifting the collapsed arch when the carrier member is peeled or stripped from the circuit. However, if desired, the carrier member can be left attached to the crossovers thereby providing a protective covering for the circuit. Or, if desired, the Kapton may be chemically removed with a suitable solvent, such as sodium hydroxide.

What is claimed is:

1. A method of crossing over intervening circuit elements of a circuit pattern, comprising the steps of:
- attaching a carrier member to a backing member having a slot therein;
- forming a conductive element on said carrier member with a selected portion of the conductive element adjacent said slot;
- deforming said selected portion of said conductive element into said slot to form a crossover arch;
- aligning said conductive element with bonding sites on the circuit pattern, said arch crossing over any intervening circuit elements;
- applying sufficient bonding energy to selected areas of said conductive element at said bonding sites to bond said conductive element thereto.

2. The method of claim 1 wherein the carrier member is a polyimide capable of absorbing water, including the steps of:
- adjusting the amount of water absorbed by the carrier member prior to bonding, the amount of water absorbed determining the adhesion strength between the carrier member and the conductive element after bonding; and
- stripping the carrier member from the crossover to test bond strength at each bonding site.

3. A method of crossing over intervening circuit elements of a circuit pattern, comprising the steps of:
- depositing an intermediate material on intervening circuit elements in those areas which are to be crossed over,
- aligning a conductive element with bonding sites on the circuit pattern, a selected portion of said conductive element passing over said intermediate material, the intermediate material spacing the selected portion of the conductive element from the intervening circuit elements,
- applying sufficient bonding energy to selected areas of said conductive element at said bonding sites to bond said conductive element thereto, said intermediate material deforming the selected portion of the conductive element to form a crossover arch.

4. The method of claim 3, including the steps of:
- attaching a carrier member to a backing member having a slot therein; and
- forming the conductive element on said carrier member with the selected portion of said conductive element overlying said slot, said deforming step including the deformation of the selected portion into said slot.

5. The method of claim 4 wherein the carrier member is a polyimide capable of absorbing water, including the steps of:

adjusting the amount of water absorbed by the carrier member prior to bonding, the amount of water absorbed determining the strength between the carrier member and the conductive element after bonding; and stripping the carrier member from the crossover to test bond strength at each bonding site.

6. The method of claim 3 wherein the intermediate material is a dielectric material which is left between the crossover arch and any intervening circuit elements.

7. The method of claim 3 including the additional step of removing the intermediate material subsequent to bonding.

8. A method of crossing over intervening circuit elements of a circuit pattern, comprising the steps of:

depositing an intermediate material on a selected portion of a conductive element, aligning said conductive element with bonding sites on the circuit pattern, said selected portion of said conductive element and said intermediate material deposited therein being located adjacent intervening circuit elements of the circuit pattern said intermediate material being interposed between said selected portion of the conductive element and said intervening circuit elements, the intermediate material spacing the selected portion of the conductive element from the intervening circuit element, applying sufficient bonding energy to selected areas of said conductive element at said bonding sites to bond said conductive element thereto, said intermediate material deforming the selected portion of the conductive element to form a crossover arch.

9. The method of claim 8, including the steps of:

attaching a carrier member to a backing member having a slot therein; and forming the conductive element on said carrier member with the selected portion of said conductive element overlying said slot, said deforming step including the deformation of the selected portion into said slot.

10. The method of claim 9 wherein the carrier member is a polyimide capable of absorbing water, including the steps of:

adjusting the amount of water absorbed by the carrier member prior to bonding, the amount of water absorbed determining the strength of attachment between the carrier member and the conductive element after bonding; and stripping the carrier member from the crossover to test bond strength at each bonding site.

11. The method of claim 8 wherein the intermediate material is a dielectric material which is left between the crossover arch and any intervening circuit elements.

12. The method of claim 8 including the additional step of removing the intermediate material subsequent to bonding.

13. A method of crossing over intervening circuit elements of a circuit pattern, comprising the steps of:

forming a conductive element on the first surface of a carrier member having first and second opposite surfaces;

depositing an intermediate material on intervening circuit elements in those areas which are to be crossed over;

placing the first surface of the carrier member against the circuit pattern and aligning said conductive element with bonding sites on the circuit pattern, a selected portion of said conductive element passing over said intermediate material;

placing a ductile backing member against the second surface of said carrier member;

applying through said ductile backing member and said carrier member sufficient bonding energy to selected areas of said conductive element at said bonding sites to bond said conductive element thereto, the ductile backing member acting through said carrier member to deform the selected portion of said conductive element over the intermediate material to form a crossover arch.

14. The method of claim 13 wherein the intermediate meterial is a dielectric material which is left between the crossover arch and intervening circuit elements.

15. The method of claim 13 including the additional step of removing the intermediate material subsequent to bonding.

16. A method of crossing over intervening circuit elements of a circuit pattern, comprising the steps of:

forming a conductive element on the first surface of a carrier member having first and second opposite surfaces;

depositing an intermediate material on a selected portion of the conductive element;

placing the first surface of the carrier member against the circuit pattern and aligning said conductive element with bonding sites on the circuit pattern, the selected portion of said conductive element and the intermediate material deposited thereon being located adjacent intervening circuit elements of the circuit pattern, the said intermediate material being interposed between said selected portion of the conductive element and said intervening circuit elements;

placing a ductile backing member against the second surface of said carrier member;

applying through said ductile backing member and said carrier member sufficient bonding energy to selected areas of said conductive element at said bonding sites to bond said conductive element thereto, the ductile backing member acting through said carrier member to deform the selected portion of said conductive element over the intermediate material to form a crossover arch.

17. The method of claim 16 wherein the intermediate material is a dielectric material which is left between the crossover arch and intervening circuit elements.

18. The method of claim 16 including the additional step of removing the intermediate material subsequent to bonding.

* * * * *